Figure 1:
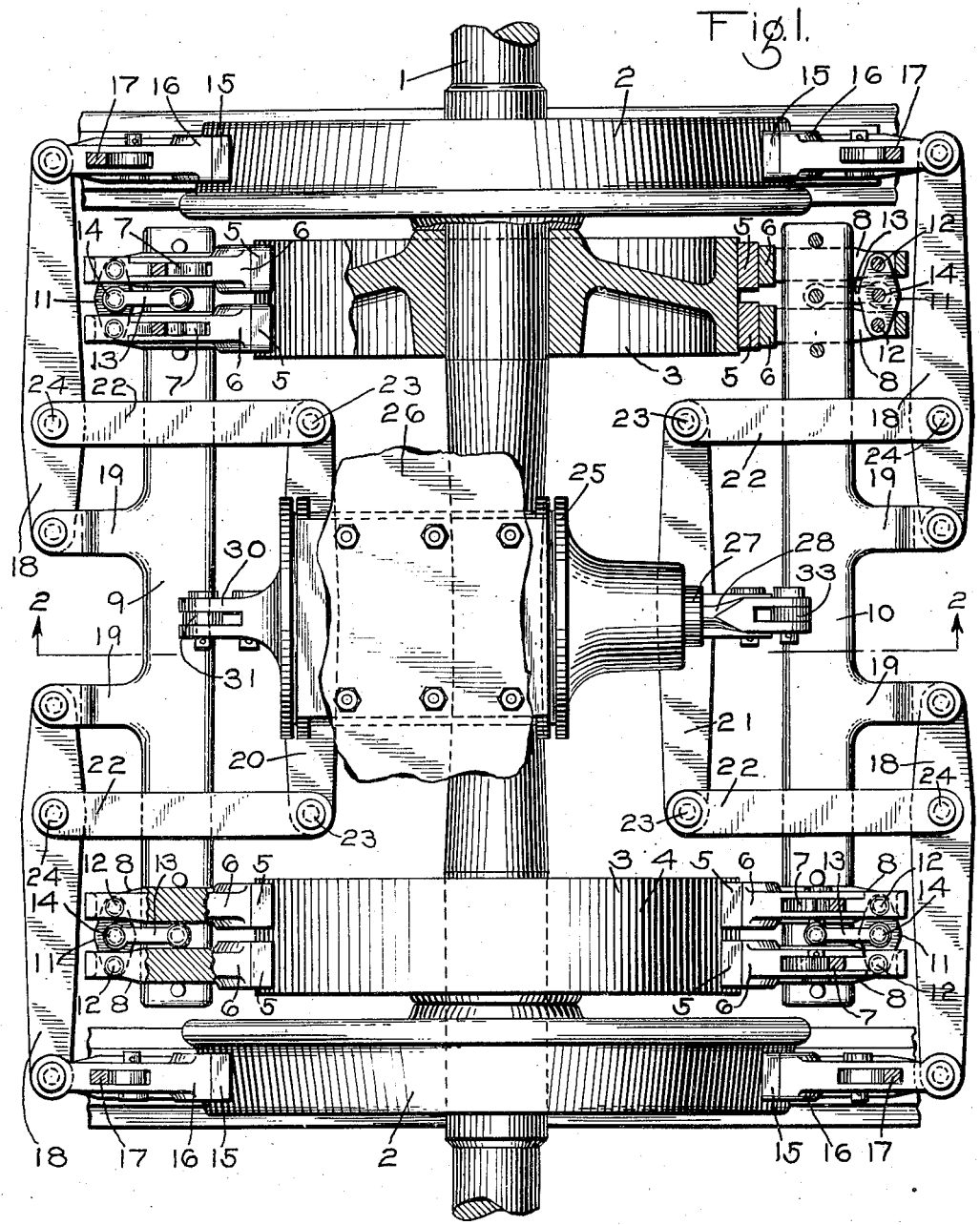

April 18, 1939.  C. C. FARMER  2,155,222
BRAKE DEVICE
Filed May 24, 1938   2 Sheets-Sheet 1

INVENTOR
CLYDE C. FARMER
BY
ATTORNEY

Patented Apr. 18, 1939

2,155,222

UNITED STATES PATENT OFFICE 2,155,222

BRAKE DEVICE

Clyde C. Farmer, Pittsburgh, Pa., assignor to The Westinghouse Air Brake Company, Wilmerding, Pa., a corporation of Pennsylvania Application May 24, 1938, Serial No. 209,649

17 Claims. (Cl. 188—56)

This invention relates to brakes for railway vehicles and more particularly to brakes of the drum type having one or more brake drums associated with one or more wheel and axle assemblies of the vehicle and which is adapted to be frictionally engaged by brake shoes disposed at one side thereof or at diametrically opposite sides in clasp arrangement.

In high speed train service it has been learned that the usual brake rigging having brake shoes which bear against the tread of the wheels in effecting an application of the brakes is inadequate to produce the desired braking action without undue wear and heating of the brake shoes and vehicle wheels. This is due particularly to the fact that the area of that portion of the face of the brake shoe which frictionally engages the face of the tread of the wheel is limited in width to the width of such treads and in length by the ability of the shoe to withstand warpage and breakage and by the proper relationship of its effective lengths to the diameter of the wheel.

For the purpose of overcoming the above difficulties it has been proposed to provide as many wheel and axle assemblies of a vehicle as is necessary with drum brakes in which the brake shoes frictionally engage one or more brake drums secured to each assembly.

The necessary limitations as to width of the tread of a wheel do not apply to a brake drum, so that the drum may be made of a width sufficient to accommodate as many brake shoes arranged side by side on one side or on diametrically opposite sides of the drum as is necessary to produce the desired braking action with a relatively low unit braking pressure on each shoe. In the drum brakes heretofore proposed the entire braking action is effected through the medium of the brake drums, there being no shoes or other friction braking elements for engagement with the treads of the wheels.

It is well known that where there is nothing to at least occasionally frictionally engage the treads of the wheels dirt is liable to collect thereon, which dirt tends to reduce adhesion between the wheel and rail and as a consequence impairs the efficacy of a brake application. Dirt adhering to the treads of the wheels also acts to cause the wheels to pound on the rail and produce objectionable noise and may also cause the wheel or rail or both to be damaged.

The principal object of the invention is to provide a combined wheel and drum brake mechanism for a railway vehicle which will be free of the above mentioned objectionable features.

Another object of the invention is to provide a brake mechanism having at least one brake element arranged for frictional braking engagement with the thread of a vehicle wheel, at least one brake element arranged for frictional braking engagement with a brake drum secured to the wheel, and mechanism for simultaneously controlling the operation of both of the brake elements.

Another object of the invention is to provide a combined wheel and drum brake mechanism having friction brake elements adapted to be actuated to frictionally engage a wheel of the vehicle and a drum rotatable with the wheel, and also having a mechanism for actuating said elements and for proportioning the power transmitted by the mechanism to each element to provide the desired unit pressure on each element.

A further object of the invention is to provide a unit brake mechanism for a wheel and axle assembly of a railway vehicle, which mechanism comprises two spaced brake drums secured to the wheel and axle assembly, a brake element for engagement with the tread of each wheel, a brake element for engagement with each drum, and a system of operatively connected brake rigging members for actuating said elements.

A still further object of the invention is to provide a unit clasp brake mechanism for a wheel and axle assembly of a railway vehicle, which mechanism comprises a pair of spaced brake drums arranged one adjacent each wheel of the assembly, brake elements disposed in clasp arrangement about each wheel, brake elements disposed in clasp arrangement about each brake drum, and a system of operatively connected brake rigging members and a single brake cylinder for actuating the brake elements.

Other objects and advantages will appear in the following more detailed description of the invention.

Figure 2:
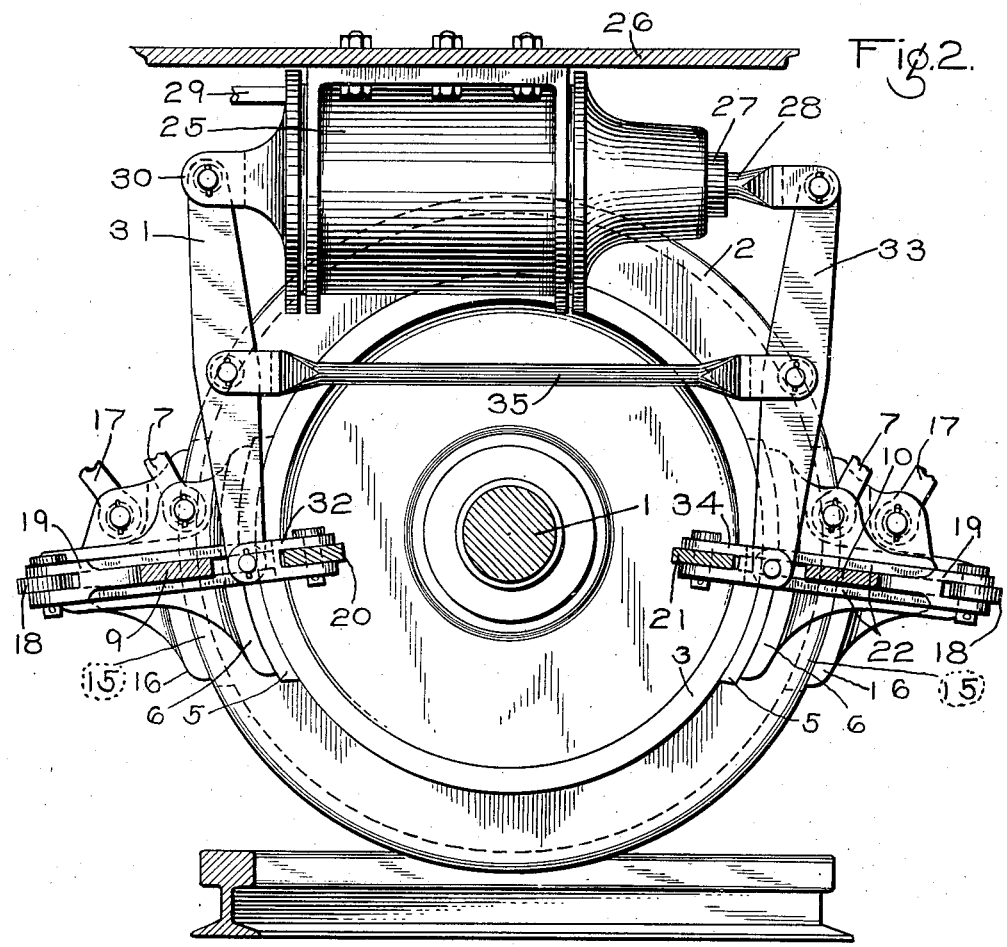

In the accompanying drawings Fig. 1 is a plan view of a combined wheel and drum brake mechanism constructed in accordance with the invention, the mechanism being shown applied to a wheel and axle assembly of a railway vehicle; and Fig. 2 is a sectional view taken on the line 2—2 of Fig. 1.

As shown in the drawings, the brake rigging is operatively associated with a wheel and axle assembly of a railway vehicle, which assembly may be of the usual type comprising an axle 1 having secured thereto in any desired manner wheels 2. The ends of the axle 1 may be journaled in the usual journal boxes which may be disposed between the usual pedestal jaws of a truck frame of the vehicle. In some types of trucks the journal boxes and truck frame are rigidly connected together, while in other types the truck frame is spring supported from the wheel and axle assembly, and in these latter types of trucks the pedestal jaw members are movable vertically with the truck frame relative to the journal boxes. Since the trucks may be of any of the usual and well known types, a showing of the truck frame, journal boxes and other parts of the truck which have no immediate bearing on the invention is deemed unnecessary and have therefore been omitted from the drawings.

Rigidly secured to the axle 1 so as to rotate therewith are two brake drums 3 which are disposed one adjacent each wheel. Each brake drum is provided with an exterior or peripheral braking surface 4 which is adapted to be frictionally engaged at diametrically opposite sides of the drum by a pair of brake shoes 5 which are carried by brake heads 6. The brake shoes and brake heads at one side of each brake drum are spaced apart in a direction longitudinally of the axle and are supported by hangers 7 which are pivotally connected to the brake heads and to the frame of the truck in the usual manner, there being a separate hanger for each brake head.

The brake heads 6 are provided with lateral slots 8 which are adapted to accommodate the ends of laterally extending brake beams 9 and 10 which terminate short of the wheels 2 of the wheel and axle assembly. These brake beams rest on the brake heads and are therefore supported from the truck frame by the hangers 7.

At a point located a short distance from the outer longitudinal end of each brake beam, the brake heads of each pair of heads are operatively connected together by means of a laterally extending horizontally disposed equalizer lever 11, the ends of the lever extending within the slots 8 in the heads and being pivotally connected to each head by means of a pin 12. The equalizer lever, intermediate its ends, is pivotally connected to the outer end of short spaced pull links 13 by means of a pin 14 and the inner ends of the links are pivotally connected to the adjacent end of the adjacent brake beam.

It will be apparent from the foregoing description that the only positive connection from the brake beams to the brake heads are through the medium of the links 13 and equalizer levers 11 and that due to such connection the brake heads of each pair of heads are free to move relative to each other and to the respective brake beam. This provides for the equalization of pressures on the brake shoes of each pair even though one brake shoe of the pair be of greater thickness than the other.

The tread of each wheel 2 is adapted to be frictionally engaged at diametrically opposite sides of the wheel by a brake shoe 15 carried by a brake head 16 which is supported from the truck frame by means of a hanger 17.

Each brake head 16 is operatively connected to the outer end of a horizontally disposed lever 18 which extends substantially parallel with the adjacent brake beams 9 and 10, as the case may be, and which is operatively connected at its inner end to a jaw forming the outer end of a member 19 which may be integral with the brake beam.

Located between the brake beams 9 and 10 and extending parallel with said beams are equalizer levers 20 and 21. Each end of the equalizer lever 20 is operatively connected to the adjacent lever 18 through the medium of vertically spaced parallel pull rods or bars 22, the inner ends of the links being pivotally connected to the lever 20 by means of a pin 23 and the outer ends being pivotally connected to the lever 18 by means of a pin 24. Each end of the equalizer lever 21 is connected in like manner to the adjacent lever 18, the links 22 being disposed one above and one below the brake beam 10 and the levers 18 and 21.

Located between the brake drum and above the axle 1 and extending transversely of the axle is a brake cylinder 25 which is bolted or otherwise secured to a portion 26 of the truck frame. This brake cylinder may be of the usual type comprising a cylinder casing in which there is mounted a piston having a hollow stem 27 in which there is mounted the push rod 28. The brake cylinder piston is not shown in the drawings but since the construction of this actuating element is well known a showing thereof is deemed unnecessary. The pressure chamber of the brake cylinders is connected to a supply and release conduit 29.

The pressure head of the brake cylinder is provided with spaced outwardly extending vertically disposed lugs 30 to which the upper end portion of a vertically disposed brake cylinder dead lever 31 is pivotally connected, the lower end of the lever being operatively connected to the equalizer lever 20 through the medium of a clevis 32.

The outer end of the brake cylinder push rod 28 is operatively connected to the upper end of a vertically disposed brake cylinder lever 33, which lever at its lower end is operatively connected to the equalizer lever 21 through the medium of a clevis 34.

The levers 31 and 33 are operatively connected together intermediate their ends by a pull rod or connecting rod 35.

It will here be noted that the pivotal connection between each lever 18 and the adjacent brake beam is located nearer to the member 19 of the brake beams than to the pivotal connection between the lever and the associated brake head 16. This is done in order to so divide the power transmitted by one end of the equalizing levers 20 or 21 as the case may be that one-third will be transmitted to the brake shoe 15 engaging the tread of the wheel and the remainder will be applied to the brake beam and through the equalizing lever 11 to the associated brake shoes 5, the lever acting to divide the power transmitted thereto equally between the two brake shoes 5. It will be understood that by changing the length of the arm of the lever 18, the proportion of power transmitted to the brake shoes will correspondingly change.

*Operation of mechanism*

In order to effect an application of the brakes fluid under pressure is supplied through the conduit 29 to the pressure chamber of the brake cylinder causing the brake cylinder piston and thereby the piston stem 27 and piston rod 28 to move outwardly, the push rod actuating the brake cylinder lever 33 and the dead lever 31 to move the equalizing levers 20 and 21 toward each other.

The levers 20 and 21, as they are thus moved, actuate the levers 18 to move the brake shoes 15 into braking engagement with the wheels 2 and to move the brake beams 9 and 10 toward each other, causing the brake shoes 5 to engage the brake drums 3. With the brake shoes 5 in engagement with the drums, the equalizer levers 11 act to transmit the same braking power to each brake shoe of each pair of shoes. With the brake shoes 5 and 15 in engagement with the wheels and drums, respectively, the levers 20 and 21 function to equalize the power transmitted to the levers 8.

It will be apparent that when an application of the brakes has been effected the brake shoes 15 besides acting to retard the motion of the wheel and axle assembly also act to maintain the treads of the wheels free of dirt which might otherwise collect thereon, thus insuring the maximum adhesion between the wheels and the track rails.

When it is desired to release the brakes, fluid under pressure is vented by way of conduit 29 from the pressure chamber of the brake cylinders, whereupon the usual release spring, not shown, of the brake cylinders acts to return the brake cylinder piston and piston rod 27 to their normal release position. As the piston is thus moving the several parts of the brake mechanism which are carried by the hanger 17 will, due to the force of gravity, function to move the brake shoes 5 and 15 and consequently the operatively connected rods and levers of the brake rigging to their normal release positions.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a brake mechanism for a wheel of a railway vehicle, in combination, a brake drum rotatable with said wheel, a brake element movable into braking engagement with said brake drum, a brake element movable into braking engagement with said wheel, and power transmitting and dividing means for actuating both of said brake elements.

2. In a brake mechanism for a wheel and axle assembly of a railway vehicle, in combination, a brake drum rotatable with said assembly, a brake element movable into braking engagement with said brake drum, a brake element movable into braking engagement with a wheel of said assembly, and power transmitting and dividing means for actuating both of said brake elements.

3. In a brake mechanism for a wheel and axle assembly of a railway vehicle, in combination, a brake drum rotatable with said assembly, brake elements disposed in clasp arrangement about each wheel of said assembly and movable into braking engagement with the wheel, brake elements disposed in clasp arrangement about said drum and movable into braking engagement with the drum, and power transmitting and dividing means for actuating said brake elements.

4. In a brake mechanism for a wheel of a railway vehicle, in combination, a brake drum rotatable with said wheel, a brake element movable into braking engagement with said brake drum, a brake element movable into braking engagement with said wheel, means for actuating the first mentioned brake element, and mechanism for actuating said means and second mentioned brake element.

5. In a brake mechanism for a wheel of a railway vehicle, in combination, a brake drum rotatable with said wheel, a brake element movable into braking engagement with said brake drum, a brake element movable into braking engagement with said wheel, a member operable to effect the operation of the first mentioned brake element, and lever means operable to actuate said member and second mentioned brake element.

6. In a brake mechanism for a wheel of a railway vehicle, in combination, a brake drum rotatable with said wheel, a brake element movable into braking engagement with said brake drum, a brake element movable into braking engagement with said wheel, a brake beam operable to effect the operation of the first mentioned brake element, a lever operable to actuate said brake beam and second mentioned brake element, and means for actuating said lever.

7. In a brake mechanism for a wheel of a railway vehicle, in combination, a brake drum rotatable with said wheel, a brake element movable into braking engagement with said brake drum, a brake element movable into braking engagement with said wheel, a brake beam operable to effect the operation of the first mentioned brake element, and a lever connecting said brake beam and second mentioned brake element operative to actuate the beam and second mentioned brake element.

8. In a brake mechanism for a wheel of a railway vehicle, in combination, a brake drum rotatable with said wheel, a brake element movable into braking engagement with said brake drum, a brake element movable into braking engagement with said wheel, a brake beam operable to effect the operation of the first mentioned brake element, and a power transmitting and dividing mechanism for actuating said beam and second mentioned brake element.

9. In a brake mechanism for a wheel of a railway vehicle, in combination, a brake drum rotatable with said wheel, a pair of brake elements movable into braking engagement with said drum, an equalizing lever for actuating said brake elements, a member for actuating said equalizing lever, a single brake element movable into braking engagement with a wheel of said assembly, and power transmitting and dividing means for actuating said single brake element and member.

10. In a brake mechanism for a wheel of a railway vehicle, in combination, a brake drum rotatable with said wheel, a pair of brake elements movable into braking engagement with said drum, an equalizing lever for actuating said brake elements, a member for actuating said equalizing lever, a single brake element movable into braking engagement with a wheel of said assembly, a lever operable to actuate said member and said single brake element, and means for actuating said lever.

11. In a brake mechanism for a wheel and axle assembly of a railway vehicle, in combination, two brake drums rotatable with said assembly, a pair of brake elements operable into braking engagement with each of said drums, an equalizer lever for actuating each pair of brake elements, a brake beam operative to actuate both equalizer levers, a brake element operative into braking engagement with each wheel of said assembly, means for actuating said brake beam and last mentioned brake element, and equalizing power transmitting means for actuating said means.

12. In a brake mechanism for a wheel and axle assembly of a railway vehicle, in combination, two brake drums rotatable with said assembly, a plurality of brake elements movable into braking engagement with said drum, an equalizing power transmitting mechanism for said brake elements, a brake element movable into braking engagement with each wheel of said assembly, and means for actuating the last mentioned brake element and equalizing power transmitting mechanism.

13. In a brake mechanism for a wheel and axle assembly of a railway vehicle, in combination, two brake drums rotatable with said assembly, a plurality of brake elements movable into braking engagement with said drum, an equalizing power transmitting mechanism for said brake elements, a brake element movable into braking engagement with each wheel of said assembly, lever means operative to actuate said equalizing power transmitting means and each last mentioned brake element, and equalizing power transmitting means operative to actuate said lever means.

14. In a brake mechanism for a wheel and axle assembly of a railway vehicle, in combination, a plurality of brake drums, rotatable with said assembly, a plurality of brake elements disposed at diametrically opposite sides of each brake drum and movable into braking engagement with the respective drum, equalizing power transmitting means for actuating the brake elements at each side of the brake drums, a single brake element located at each side of each wheel of the assembly movable into braking engagement with the respective wheel, two levers for actuating the equalizing power transmitting means and the last mentioned brake element on one side of each wheel, and equalizing power transmitting means for actuating said levers.

15. In a brake mechanism for a wheel and axle assembly of a railway vehicle, in combination, a plurality of brake drums secured to said assembly to rotate therewith, two sets of a plurality of brake elements disposed in clasp arrangement about each drum and movable into braking engagement with the drum, two brake elements disposed in clasp arrangement about each wheel of said assembly, two equalizing power transmitting mechanism arranged one at each side of the assembly and each operable to actuate the sets of brake elements at the same side of the assembly, two levers arranged at each side of the assembly operative to actuate the equalizing power transmitting means, and each lever being adapted to actuate one of the second mentioned brake elements, and equalizing power transmitting means for actuating all of the levers.

16. In a brake mechanism for a wheel and axle assembly of a railway vehicle, in combination, a plurality of brake drums secured to said assembly to rotate therewith, two sets of a plurality of brake elements disposed in clasp arrangement about each drum and movable into braking engagement with the drum, two brake elements disposed in clasp arrangement about each wheel of said assembly, two equalizing power transmitting mechanism arranged one at each side of the assembly and each operable to actuate the sets of brake elements at the same side of the assembly, two levers arranged at each side of the assembly operative to actuate the equalizing power transmitting means, and each lever being adapted to actuate one of the second mentioned brake elements, a system of operatively connected brake rigging members for actuating all of said levers, and a brake cylinder for actuating said brake rigging members.

17. In a brake mechanism for a wheel and axle assembly of a railway vehicle, in combination, a plurality of brake drums secured to said assembly to rotate therewith, two sets of a plurality of brake elements disposed in clasp arrangement about each drum and movable into braking engagement with the drum, two brake elements disposed in clasp arrangement about each wheel of said assembly, two equalizing power transmitting mechanism arranged one at each side of the assembly and each operable to actuate the sets of brake elements at the same side of the assembly, two levers arranged at each side of the assembly operative to actuate the equalizing power transmitting means, and each lever being adapted to actuate one of the second mentioned brake elements, a system of operatively connected brake rigging members for actuating all of said levers, and a brake cylinder arranged between said drums and above the axle of the wheel and axle assembly for actuating said brake rigging members.

CLYDE C. FARMER.